May 26, 1925.
M. B. HOLSTEIN
AIR PUMP
Filed June 11, 1924
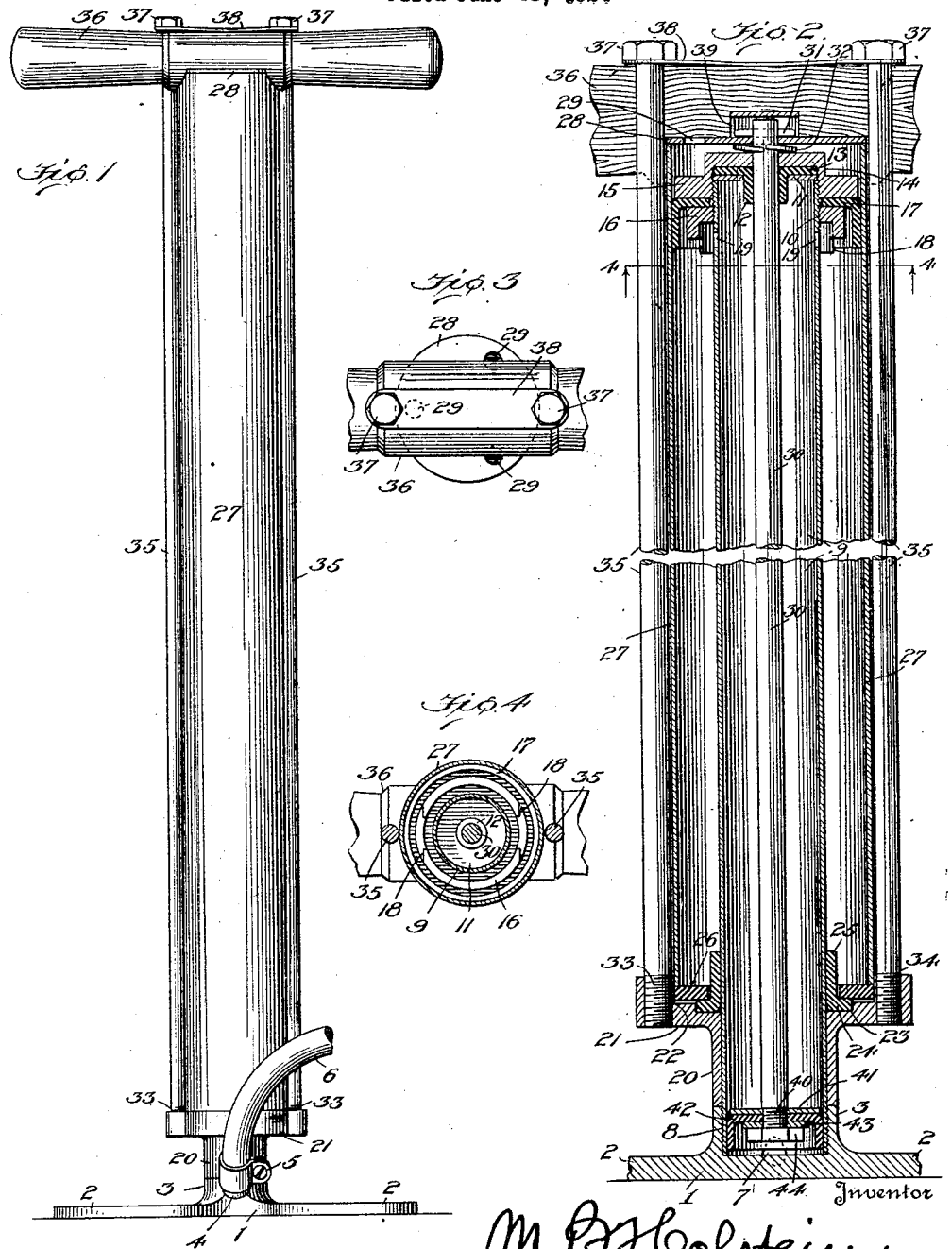
Witness
Edwin L. Bradford
Inventor
M. B. Holstein,
By Wm E. Dye
Attorney Patented May 26, 1925.

1,539,486

UNITED STATES PATENT OFFICE.

MICHAEL B. HOLSTEIN, OF RICHLAND, PENNSYLVANIA.

AIR PUMP.

Application filed June 11, 1924. Serial No. 719,331.

*To all whom it may concern:*

Be it known that I, MICHAEL B. HOLSTEIN, a citizen of the United States, residing at Richland, in the county of Lebanon and State of Pennsylvania, have invented certain new and useful Improvements in Air Pumps; and I do hereby declare the following to be a full, clear, and exact description of the invention, such as will enable others skilled in the art to which it appertains to make and use the same.

This invention relates to improvements in air pumps and more particularly to hand operated high-pressure air pumps of the type disclosed in my Patent 1,330,266, Feb. 10, 1920. The pump illustrated in said patent has proved efficient in practice, and the primary object of the present invention is to improve pumps of this character, so that they may be manufactured and assembled at less expense than the pump disclosed in said prior patent.

Another object of the invention is to provide an air pump having a small number of threaded joints, so that the pump may be manufactured without providing the parts with a multiplicity of screw-threads.

With the foregoing objects outlined and with other objects in view, which will appear as the description proceeds, the invention consists in the novel features hereinafter described in connection with the accompanying drawings and more particularly pointed out in the appended claims.

Referring to the drawing:—

Fig. 1 is a side view of my improved pump.

Fig. 2 is an enlarged vertical longitudinal sectional view of the same.

Fig. 3 is a top plan view, partly broken away.

Fig. 4 is a horizontal sectional view on a reduced scale taken on line 4—4 of Fig. 2.

In the drawing, 1 designates a base or standard having laterally directed wings 2 upon which the operator may stand in using the pump. The base also includes a socket 3 having a nipple 4 connected by a clip 5 to flexible tubing 6, that is adapted to be connected to the tire or the like to be inflated. The interior of the nipple, communicates with the interior of the socket, as shown at 7 in Fig. 2.

The socket 3 is provided with internal screw threads to engage external screw threads 8 arranged at the lower end of a high pressure cylinder or tube 9, this threaded joint being one of the five threaded joints in the present construction. The cylinder 9, to reduce the cost of manufacture, is preferably made of standard tubing and has additional external threads 10 at its upper end. Resting on the upper edge of the cylinder 9, is an annular disk 11 through which extends a depending collar 12 of a flexible packing ring 13. Arranged over the packing ring, is an inverted metallic cup 14 having internal threads engaging the threads 10 of the cylinder 9 and holding the packing ring 13 in compressed relation relatively to the disk 11. The cup 14 has an outwardly extending annular flange 15 functioning as a stationary low pressure piston, in a manner hereinafter explained. The joint provided by the threads 10, is the second threaded joint in the construction, and the third threaded joint is provided by a gland 16 which surrounds the cylinder 9 and has internal threads engaging the threads 10, for the purpose of forcing a packing ring 17 against the flange 15. This packing ring is in the shape of an inverted cup washer and it forms an air valve, as will be hereinafter explained. The gland 16 is of annular form and has diametrically opposite flattened sides, as shown at 18 in Fig. 4. These flat portions permit the gland to be tightened or adjusted by an ordinary monkey-wrench. The cylinder 9 has air ports 19 arranged near its upper end and opening into the hollow space in the gland 16. All of these parts are the stationary portions of the pump, and the movable portions will now be described.

Surrounding the cylinder 9, is a sleeve 20, which is slidably mounted on the cylinder and is provided at its upper end with an annular cup 21. This cup is provided with a large circular recess 22 and a smaller circular recess 23, which merge into one another. The smaller recess receives an annular packing 24 arranged at the lower end of a packing ring 25, the latter snugly engaging the exterior surface of the cylinder 9 and being forced against said surface by air pressure, as hereinafter described.

Seated in the larger recess 22 is a compressible washer 26 which bears at its inner edge against the ring 24. A larger concentric outer low pressure cylinder 27, has its lower edge extending into the recess 22 and bears upon the washer 26, to provide an air tight joint at this point, without the use of screw-threads. This low pressure cylinder may also be formed of an ordinary piece of standard tubing, and owing to my present construction, this piece of tubing need not be threaded.

Resting on the upper edge of the cylinder 27, is a circular disk 28 provided with at least three air inlet ports 29 equally distributed over the plate. This plate or disk 28 has a central aperture to receive the upper end of a piston rod 30, the latter being provided near its upper end with a transverse aperture to receive the loosely fitting pin 31, which is arranged above the disk 28 and functions to prevent the rod from moving downwardly relatively to the disk. A split spring washer 32 is arranged between the cup 14 and disk 28 to prevent these parts from coming together and to absorb the shocks caused by the downward movement of the low pressure cylinder 27 relatively to the stationary cylinder 9.

The cup 21 has diametrically opposite threaded apertures to receive the threaded lower ends 33 and 34 of tie rods or bolts 35. These two threaded joints form the remaining ones of the five threaded joints in the construction, and this is five less threaded joints than is used in the construction disclosed in my above mentioned patent. The upper ends of the bolts extend through a cross bar or operating handle 36 and have heads 37, which bear upon opposite ends of a bow-shaped leaf spring 38. This leaf spring has a tendency to pull upwardly on the heads of the bolts, and thereby cause the threads 33 and 34 to interlock with the threads of the cup 21 and prevent the parts from accidentally disassembling.

From Fig. 2, it may be seen that the underside of the handle 26, has a recess to receive the upper end of the low pressure cylinder 27 and the disk 28, and a smaller recess 39 is provided in the handle to receive the upper end of the rod 30 and the pin 31. This recess 39 has a diameter slightly greater than the length of the pin 31 to prevent the pin from accidentally disconnecting itself from the rod 30.

The rod 30 has threads 40 at its lower end, to receive a piston 41 of less diameter than the inner diameter of the cylinder 9, and a cup-leather washer 42 is pressed against the piston by a metal washer 43 and a nut 44.

The operation is as follows: The operator stands upon the wings 2 and grasps the handle 36, and then moves this handle up and down. As the handle moves upwardly, it carries with it the low pressure cylinder 27, and air rushes in to the upper end of this cylinder through one or more of the apertures 29. These apertures are so placed, that even if the disk 28 rotates about the rod 30, one or more of the holes 29 will be at one or the other side of the handle 36, so that the air may enter the cylinder 27. When the handle has been pulled up its full stroke, and the operator commences to force the handle downwardly, some of the air previously drawn into the upper end of the cylinder 27 will be forced downwardly past the periphery of the stationary piston or flange 15 and also past the cup-leather 17 into the lower portion of the low pressure cylinder. Then on the next up-stroke of the pump, this air will be compressed and act against the inner surface of the washer 17 so as to seal the space between the washer and the inner surface of the cylinder 27. Consequently this air must travel through the apertures 19 in to the high pressure cylinder 9, and as the piston 41 is moving upwardly at this time, this compressed air will move downwardly past the periphery of the piston 41 and the periphery of the cup washer 42, into the lower end of the cylinder 9. Now on the down-stroke of the pump, this compressed air will be compressed to a higher degree and will be passed out through the aperture 7 into the tire or the like to be inflated.

From the foregoing it is believed that the construction, operation and advantages of the invention may be readily understood, but to point out more specifically the simplicity and the practicability of the pump, it is deemed advisable to refer to the manner of dismantling the construction, to demonstrate the ease with which the parts may be assembled or dismantled.

When the bolts 35 are unscrewed and removed, the handle 36 may also be removed. Then the pin 31 may be withdrawn and the disk 28 may be disconnected. Now the low pressure cylinder 27 can be detached by simply raising the same away from the cup 21, and the operator may readily view the stationary piston 15 and the parts connected to the same. This piston and its connected parts, may be readily disassembled by unscrewing the cup 14 and subsequently the gland 16, from the stationary cylinder 9. Now if desired, the rod 30 may be raised and the smaller piston 41 and its connected parts may be removed.

While I have disclosed the preferred embodiment of the invention, it is apparent that changes may be made in the details without departing from the spirit of the invention as expressed in the claims.

What I claim and desire to secure by Letters-Patent is:

1. An air pump including a base, a high pressure stationary cylinder having its lower end connected to said base, a stationary piston closing the upper end of said cylinder, a sleeve slidably arranged on the periphery of said cylinder, a cup at the upper end of said sleeve, a low pressure cylinder having the lower portion of its periphery smooth and extending into said cup, a compressible washer arranged in the cup and engaging the lower end of the low pressure cylinder, an apertured plate arranged at the upper end of the low pressure cylinder and forming a cap for the latter, a handle arranged above the cap, and tie rods extending through the handle and in threaded connection at their lower ends with said cup.

2. An air pump including a base, a threaded socket, upon said base, a high pressure cylinder having threads at its lower end engaging the threads of the socket, said cylinder having air inlet ports near its upper end and an air outlet port at its lower end, a detachable cap for the upper end of the cylinder forming a stationary piston, a sleeve slidably mounted on the periphery of the cylinder and provided with a cup, a flexible packing ring associated with the cup and bearing against the outer surface of the cylinder, a low pressure cylinder surrounding the high pressure cylinder and having the surfaces of its end portions smooth, the lower end of the low pressure cylinder extending into said cup, a plate resting on the upper end of the low pressure cylinder and provided with air inlet ports, a handle arranged above said plate, detachable means connecting the handle to the cup, a piston rod having its upper end connected to the handle, a piston arranged in the high pressure cylinder, connected to the rod and being of less diameter than the internal diameter of the high pressure cylinder, and cup-washers connected to said pistons and arranged to permit air to pass by the pistons when the handle is moved in one direction and to prevent air from moving past the pistons when the handle is moved in the opposite direction.

3. In an air pump, a high pressure cylinder, a sleeve slidably mounted on the periphery of said cylinder, an annular enlargement upon the upper portion of said sleeve having a cupped upper surface, packing means connected to the said cupped surface and bearing upon the periphery of the cylinder, a low pressure cylinder having an unthreaded lower end portion loosely fitting in said cupped surface and bearing upon the packing means, and means for forcing the lower end of the low pressure cylinder into the cupped portion of the said slidable sleeve.

4. In an air pump, a low pressure cylinder, a cap plate for said cylinder resting loosely upon one end of the latter and provided with at least three apertures equally spaced radially about the axis of the disk, a handle bearing upon said disk and of less width than the diameter of the disk to permit one or more of said apertures to admit air to the cylinder regardless of the position of the apertures relatively to the axis of the disk, and means for holding said cylinder, disk and handle together.

5. In an air pump, a cylinder having a cap plate, a piston rod extending into the cylinder and having an aperture near one end, a pin extending through said aperture for holding the plate in engagement with the rod, and a handle connected to the cylinder and having a recess in which the pin is housed, said recess being of slightly greater diameter than the length of the pin and having its walls arranged to prevent accidental detachment of the pin from the rod.

6. In an air pump, a cup provided with packing means, a cylinder having one of its ends extending into the cup and bearing against the packing means, a plate resting on the opposite end of the cylinder, said cup being provided with screw threaded apertures, a handle bearing upon said plate, a bow-shaped spring bearing upon the handle and normally having its ends extending upwardly, and bolts passing through the ends of the spring and said handle and engaging the threaded apertures of the cup.

7. In an air pump a high pressure cylinder, a sleeve slidably mounted upon the exterior of said cylinder, an annular enlargement upon the upper end of said sleeve having a cupped upper surface, a suitable packing between said sleeve and said cylinder, a low pressure cylinder formed of plain unthreaded tubing loosely fitting within the cupped upper end of the slidable sleeve aforesaid, an annular packing gland forming a seat for the lower end of said low pressure cylinder, a vented closure for the upper end of the last named cylinder, and means for retaining the latter cylinder in air tight contact with its said packing gland.

8. In an air pump a high pressure cylinder, a sleeve slidably mounted upon the exterior of said cylinder, an annular enlargement upon the upper end of said sleeve, a packing-seat cupped out of the upper surface of said enlargement, a second packing seat counterbored concentrically in said first seat, a flanged cup packing ring for the high pressure cylinder resting in said second seat, an annular packing ring directly surmounting the flange of the said cup packing located in the outermost and uppermost of said packing seats, a low pressure cylinder formed of plain unthreaded tubing resting at its lower end upon the said outermost annular packing ring, a vented closure for the upper end of the low pressure cylinder, and exterior tie rods arranged and adapted to operatively connect the sliding sleeve and the vented closure at opposite ends of the low pressure cylinder.

In testimony whereof I affix my signature.

MICHAEL B. HOLSTEIN.